(12) United States Patent
Kusabuka

(10) Patent No.: US 11,392,021 B2
(45) Date of Patent: Jul. 19, 2022

(54) VIDEO PRESENTATION SYSTEM AND VIDEO PRESENTATION METHOD

(71) Applicant: NIPPON TELEGRAPH AND TELEPHONE CORPORATION, Tokyo (JP)

(72) Inventor: Takahiro Kusabuka, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 74 days.

(21) Appl. No.: 16/970,851

(22) PCT Filed: Feb. 21, 2019

(86) PCT No.: PCT/JP2019/006597
§ 371 (c)(1),
(2) Date: Aug. 18, 2020

(87) PCT Pub. No.: WO2019/163903
PCT Pub. Date: Aug. 29, 2019

(65) Prior Publication Data
US 2021/0088892 A1    Mar. 25, 2021

(30) Foreign Application Priority Data
Feb. 22, 2018    (JP) .............................. JP2018-029920

(51) Int. Cl.
*G03B 21/14*    (2006.01)
*H04N 9/31*    (2006.01)
*G03B 21/608*    (2014.01)

(52) U.S. Cl.
CPC ......... *G03B 21/608* (2013.01); *G03B 21/147* (2013.01); *H04N 9/317* (2013.01); *H04N 9/3185* (2013.01)

(58) Field of Classification Search
CPC ...... G03B 21/00; G03B 21/14; G03B 21/608; G03B 21/147; H04N 9/31; H04N 9/317; H04N 9/3185
(Continued)

(56) References Cited

U.S. PATENT DOCUMENTS 8,825,225 B1 * 9/2014 Stark ....................... G09F 21/14
701/2
8,862,285 B2 * 10/2014 Wong ..................... F21V 11/00
701/2

(Continued)

FOREIGN PATENT DOCUMENTS

JP    H03258367 A    11/1991
JP    H05107644 A    4/1993
(Continued)

*Primary Examiner* — William C. Dowling

(57) ABSTRACT

Provided is an image presentation system 10, including: a plurality of particle emission units 20 each of which emits particles; an image projection unit 30; and a control unit 50. The control unit 50 controls to cause collision of particles emitted from a first particle emission unit 20 (#1), out of the plurality of particle emission units 20, and particles emitted from a second particle emission unit 20 (#2), out of the plurality of particle emission units, so as to generate a retention field 60 that is used as a screen to which an image is project, and the image projection unit 30 projects an image to the retention field 60.

5 Claims, 3 Drawing Sheets

(58) Field of Classification Search
USPC .............................. 353/28, 121, 122; 359/443
See application file for complete search history.

(56) References Cited

U.S. PATENT DOCUMENTS

| | | | |
|---|---|---|---|
| 10,068,506 B2* | 9/2018 | Garcia Morchon . | G03B 15/006 |
| 11,163,228 B2* | 11/2021 | Kusabuka ............ | G03B 21/145 |
| 2016/0282710 A1* | 9/2016 | Evreinov ............. | G03B 21/608 |

FOREIGN PATENT DOCUMENTS

| | | | |
|---|---|---|---|
| JP | 2004298607 | A | 10/2004 |
| JP | 20073068 | A | 1/2007 |
| JP | 20093222 | A | 1/2009 |
| JP | 201022642 | A | 2/2010 |
| JP | 2013156318 | A | 8/2013 |
| JP | 2016189000 | A | 11/2016 |
| JP | 2016197192 | A | 11/2016 |

\* cited by examiner

VIDEO PRESENTATION SYSTEM AND VIDEO PRESENTATION METHOD

CROSS-REFERENCE TO RELATED APPLICATIONS

This application is a 371 U.S. National Phase of International Application No. PCT/JP2019/006597, filed on Feb. 21, 2019, which claims priority to Japanese Application No. 2018-029920, filed on Feb. 22, 2018. The entire disclosures of the above applications are incorporated herein by reference.

TECHNICAL FIELD

The present invention relates to an image presentation system that forms the air in any location in space utilizing the retention of particles, and an image presentation method thereof.

BACKGROUND ART

Recently as display techniques advance, visual displays are disposed indoors and outdoors for navigation, signage and the like.

Such a visual display, however, is fixed at a specific location, and the user themselves must move to see the screen in accordance with the location of the visual display.

For example, PTL 1 discloses a technique to install a screen for a visual display on a cart to make the visual display movable.

CITATION LIST

Patent Literature

[PTL 1] Japanese Patent Application Publication 2016-197192

SUMMARY OF THE INVENTION

In the case of the image presentation method using this conventional type of visual display, spatial scalability is low since the location of the screen is fixed.

For example, moving the screen to another location generates time lag until the image is displayed, and additionally, the screen cannot be used in a place where moving the screen is difficult.

With the foregoing in view, it is an object of the present invention to provide an image presentation system that can present an image without time lag and without being restricted by location by forming a screen in any location in space, and an image presentation method thereof.

To achieve the above object, a first aspect of the present invention is an image presentation system, including: a plurality of particle emission units each of which emits particles; an image projection unit; and a control unit. The control unit controls to cause collision of particles emitted from a first particle emission unit, out of the plurality of particle emission units, and particles emitted from a second particle emission unit, out of the plurality of particle emission units, so as to generate a retention field that is used as a screen to which an image is projected, and the image projection unit projects an image to the retention field.

A second aspect of the present invention is the image presentation system according to claim 1, wherein the particles emitted from the first particle emission unit and the second particle emission unit are emitted in a state of being enclosed by vortex rings.

A third aspect of the present invention is the image presentation system according to claim 1, wherein the first particle emission unit and the second particle emission unit are configured to emit particles in any direction.

A fourth aspect of the present invention is the image presentation system according to claim 1, wherein the image projection unit further includes: a focal distance calculation unit that calculates a focal distance so that the image is focused in the retention field; and a focal point control unit that controls the image projection unit based on the calculated focal distance.

A fifth aspect of the present invention is an image presentation method including steps of: causing collision of particles emitted from a first particle emission unit and particles emitted from a second particle emission unit, so as to generate a retention field that is used as a screen to which an image is projected; and projecting an image to the generated retention field.

According to the present invention, an image presentation system that can present an image without time lag and without being restricted by location, and an image presentation method thereof can be implemented.

DESCRIPTION OF EMBODIMENTS

An image presentation system to which an image presentation method according to an embodiment of the present invention is applied will be described with reference to the drawings.

Figure 1:
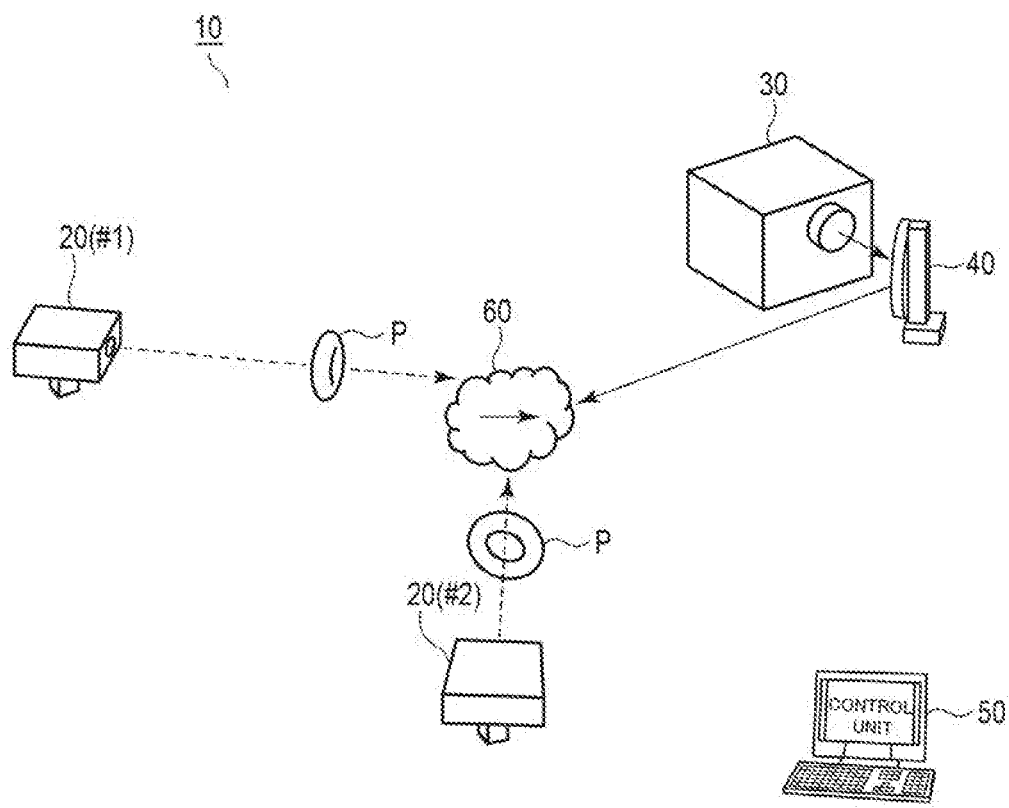
FIG. 1 is a schematic diagram depicting a configuration example of an image presentation system to which an image presentation method according to an embodiment of the present invention is applied.

FIG. 1 is a conceptual diagram depicting a configuration example of the image presentation system to which the image presentation method according to the embodiment of the present invention is applied.

Figure 2:
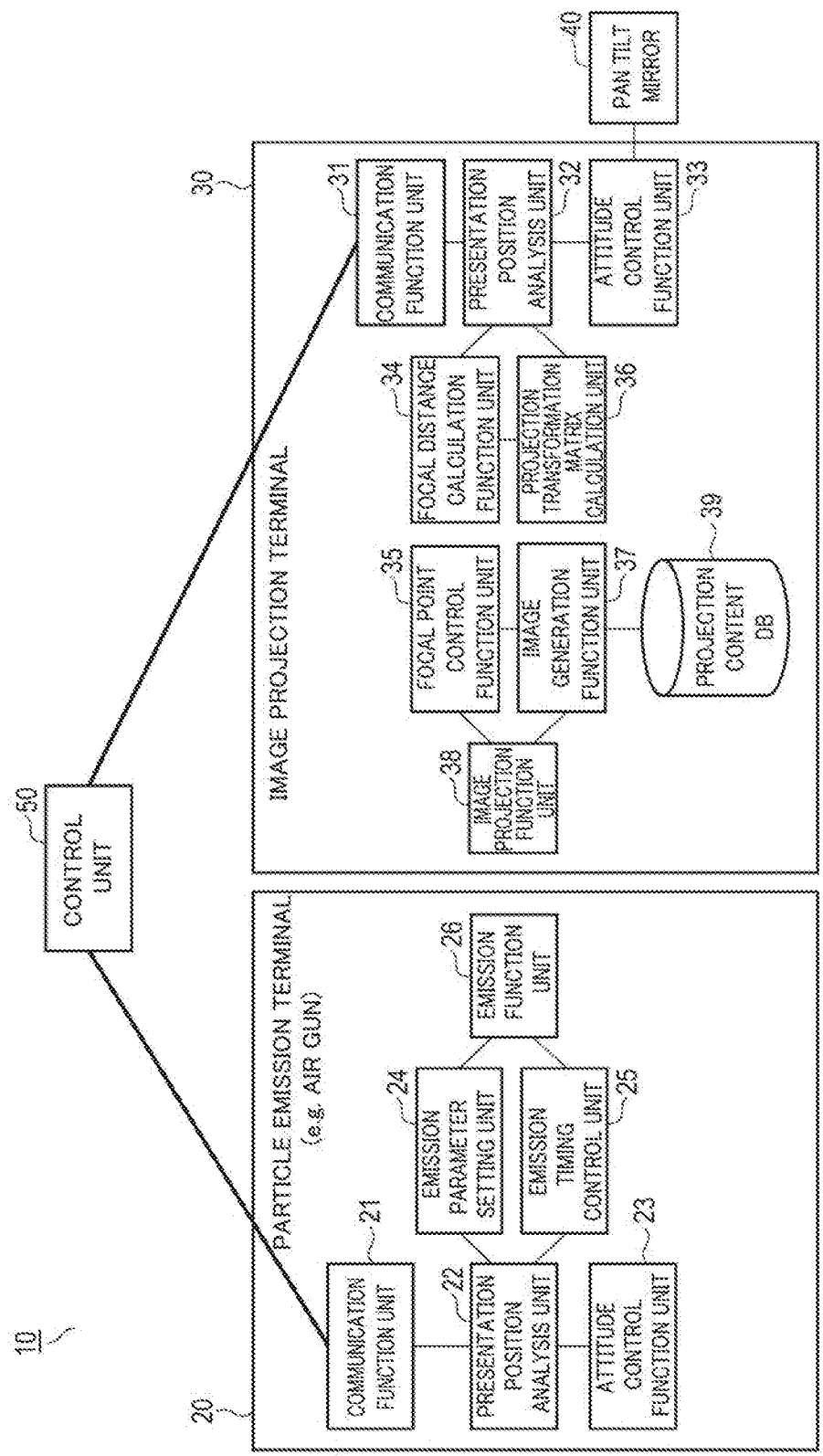
FIG. 2 is a block diagram depicting the configuration example of the image presentation system to which the image presentation method according to the embodiment of the present invention is applied.

FIG. 2 is a block diagram depicting a configuration example of the image presentation system to which the image presentation method according to the embodiment of the present invention is applied.

The image presentation system 10 to which the image presentation method according to the embodiment of the present invention is applied includes: a plurality of particle emission terminals 20 that emit particles; an image projection terminal 30 that projects an image; a pan tilt mirror 40; and a control unit 50 that controls these components. The control unit 50 receives input from the user of such information as a position where an image is presented, and a method of emitting particles from the particle emission terminal 20.

In FIG. 1, two particle emission terminals 20 (#1) and 20 (#2), which are disposed separate from each other, are illustrated as an example. However, a number of particle emission terminals 20 may be three or more.

The particle emission terminal 20, which is an air gun for example, includes a communication function unit 21, a presentation position analysis unit 22, an attitude control function unit 23, an emission parameter setting unit 24, an emission timing control unit 25 and an emission function unit 26.

The communication function unit 21 communicates with the control unit 50 in order to control the presentation position analysis unit 22, the attitude control function unit 23, the emission parameter setting unit 24, the emission timing control unit 25, and the emission function unit 26, and receives such information as an image presentation position, an emission timing to emit particles, and an emission speed, from the control unit 50. The method of determining the emission timing and the emission speed by the control unit 50 will be described later. The image presentation position corresponds to a position of a retention field 60 where particles emitted from the particle emission terminal 20 are retained and form an aerial screen.

The presentation position analysis unit 22 analyzes the presentation position received by the communication function unit 21, and converts the analyzed presentation position into coordinates.

Based on the coordinates converted by the presentation position analysis unit 22, the attitude control function unit 23 determines the attitude (angle) of the particle emission terminal 20 in order to carry the particles to the coordinates, and drives a pan tilt servo motor (not illustrated), for example, based on the determined attitude (angle), so as to turn the emission function unit 26 to the emission direction (pan direction, tilt direction).

A concrete example of the control by the attitude control function unit 23, to turn the emission function unit 26 to the pan direction or the tilt direction, will be described herein below.

First the attitude control function unit 23 determines a vector passing through a point (x, y, z) in space and a center point (xcenter, ycenter, zcenter) of the particle emission terminal 20. Then using the inner product of the current normal vector of the emission function unit 26 and the determined vector, the attitude control function unit 23 determines an angle θ formed by the two lines for the pan direction and the tilt direction respectively, and drives the pan tilt servo motor (not illustrated).

The emission parameter setting unit 24 sets the parameters of the emission function unit 26 based on the emission speed received by the communication function unit 21. In the case where the emission function unit 26 emits particles by driving a speaker, such as the case of a subwoofer, the parameters include parameters for cycle, amplitude and waveform type (e.g. sine wave, sawtooth wave).

The emission timing control unit 25 determines a timing to drive the emission function unit 26 based on the emission timing received by the communication function unit 21, and outputs the emission trigger to the emission function unit 26 in accordance with this timing.

The emission function unit 26 includes a speaker, such as a subwoofer, and has a structure in which a circular hole (not illustrated) is formed to generate particles enclosed in the vortex ring P, and emit the vortex ring P in a variable direction. The emission function unit 26 emits the particles enclosed in the vortex ring P in the emission direction, which is turned to by the attitude control function unit 23, in accordance with the parameters set by the emission parameter setting unit 24 and the emission trigger outputted by the emission timing control unit 25. The vortex ring P is a doughnut like closed vortex filament that is formed when air is pushed out of the circular hole (not illustrated) of the emission function unit 26, and is suitable for stably carrying particles to the retention field 60 which is used as the aerial screen to which an image is projected, since the vortex ring can stably move in the air in a state of enclosing the particles. To stably carry the particles to the retention field 60, a soliton may be used instead of the vortex ring P.

The particles enclosed in the vortex ring P are preferably particles having a particle size (not longer than 10 times the wavelength of visible light) which causes Mie scattering for performing image projection. For the source of generating particles, propylene glycol, for example, is used, and particles are filled by a fog generation apparatus (not illustrated). Propylene glycol is commonly used to generate smoke on a stage set, and the particles thereof cause Mie scattering. Propylene glycol is also used as a food additive and a moisturizing agent, and is harmless to the human body.

In order to cause the collision of particles emitted from the plurality of particle emission terminals 20 (e.g. particle emission terminal 20 (#1) and particles emission terminal 20 (#2)) and generate the retention field 60, the control unit 50 determines the emission timing and emission speed when the particles are emitted from each particle emission terminal 20, and notifies this information to each particle emission terminal 20. Furthermore, the control unit 50 sets parameters on the operation of the image projection terminal 30, controls synchronization of the operation timing, generates the image to be projected, and performs affine transformation and projection transformation in accordance with the projection position.

There are two methods of controlling the collision of particles emitted from the plurality of particle emission terminals 20 (e.g. particle emission terminals 20 (#1) and (#2)): Method 1, in which the emission speed is constant and the emission timing is controlled; and Method 2, in which the emission timing is constant and the emission speed is controlled. The user determines which method is used, and inputs that determination to the control unit 50.

(Method 1)

In the case where the user inputs Method 1, the control unit 50 determines the length from each particle emission terminal 20 to the retention field 60 respectively, and delays the timing of the emission from the particle emission terminal 20, which is located closer to the retention field 60, by the time acquired by dividing the difference of the determined lengths by the emission speed. For example, it is assumed that the emission speed is 4 (m/sec), the length from the particle emission terminal 20 (#1) to the retention field 60 is 13.0 (m), and the length from the particle emission terminal 20 (#2) to the retention field 60 is 8.2 (m). In this case, the particle emission terminal 20 (#2) is located closer to the retention field 60 than the particle emission terminal 20 (#1), and the difference of the lengths thereof is 13.0−8.2=4.8 (m), and the result of dividing this difference of the lengths 4.8 (m) by the emission speed 4 (m/sec) is 1.2 (sec). In this case, for the particles emitted from each particle emission terminal 20 (#1) and 20 (#2) to reach the retention field 60 simultaneously, the emission timing and the emission speed are notified to each particle emission terminal 20 so that the vortex ring is emitted from the particle emission terminal 20 (#2) 1.2 (sec) after the particles are emitted from the particle emission terminal 20 (#1).

(Method 2)

In the case where the user inputs Method 2, the control unit 50 determines the length from each particle emission terminal 20 to the retention field 60 respectively, and determines each emission speed based on the determined lengths, so that the particles reach the retention field 60 simultaneously. For example, it is assumed that the length from the particle emission terminal 20 (#1) to the retention field 60 is 13.0 (m), and the length from the particle emission terminal 20 (#2) to the retention field 60 is 8.2 (m). In this case, for the particles to reach the retention field 60 5 seconds later, the emission timing and the emission speed are notified to each particle emission terminal 20 so that the particles are simultaneously emitted from the particle emission terminal 20 (#1) at the speed of 13/5=2.6 (m/sec), and from the particle emission terminal 20 (#2) at the speed of 8.2/5=1.64 (m/sec).

The image projection unit 30 includes a communication function unit 31, a presentation position analysis unit 32, an attitude control function unit 33, a focal distance calculation function unit 34, a focal point control function unit 35, a projection transformation matrix calculation unit 36, an image generation function unit 37, an image projection function unit 38, and a projection content database (also referred to as "projection content DB") 39.

The communication function unit 31 communicates with the control unit 50 in order to control the presentation position analysis unit 32, the attitude control function unit 33, the focal distance calculation function unit 34, the focal point control function unit 35, the projection transformation matrix calculation unit 36, the image generation function unit 37, the image projection function unit 38, and the projection content DB 39, and receives information on the presentation position of the image, that is, the position of the retention field 60.

The presentation position analysis unit 32 analyzes the presentation position, that is, the position of the retention field 60, received by the communication function unit 31, and converts the position into coordinates.

The attitude control function unit 33 controls the attitude of the image projection terminal 30 and the pan direction and tilt direction of the pan tilt mirror 40 based on the coordinates converted by the presentation position analysis unit 32.

An example of the control of the pan direction and tilt direction of the pan tilt mirror 40, performed by the attitude control function unit 33, will be described.

First the attitude control function unit 33 determines a vector passing through a certain point (x, y, z) in space and a mirror center point (xmirror, ymirror, zmirror) of the pan tilt mirror 40. Then using the inner product of the normal vector of the current mirror surface of the pan tilt mirror 40 and the vector determined above, an angle θ formed by the two lines is determined for the pan direction and the tilt direction respectively. Since the incident light from the image projection function unit 38 to the pan tilt mirror 40 causes mirror reflection, a pan tile servo motor (not illustrated) is driven at an angle θ/2, which is the angle θ multiplied by ½.

The focal distance calculation function unit 34 calculates the focal distance so that the image is focused on the coordinates converted by the presentation position analysis unit 32.

The focal point control function unit 35 controls the image projection function unit 38 based on the focal distance calculated by the focal distance calculation function unit 34.

The projection transformation matrix calculation unit 36 calculates the transformation matrix, with which the projection image is not distorted, based on the coordinates converted by the presentation position analysis unit 32. This corresponds to the keystone correction function used for projectors.

The image generation function unit 37 selects the projection content from the projection content DB 39, and performs the projection transformation for the projection content using the transformation matrix calculated by the projection transformation matrix calculation unit 36.

The projection content DB 39 is a database storing the content to be projected.

The image projection function unit 38 projects the projection content transformed by the image generation function unit 37 under control of the focal point control function unit 35.

The pan tilt mirror 40 is a mirror having a mechanism to rotate in the pan direction and tilt direction, so as to reflect the projection content projected by the image projection function unit 38, and to guide the content to the retention field 60. The pan direction and tilt direction of the pan tilt mirror 40 are controlled by the attitude control function unit 33.

An operation example of the image presentation system 10, to which the image presentation method according to the embodiment of the present invention described above is applied, will be described next.

Figure 3:
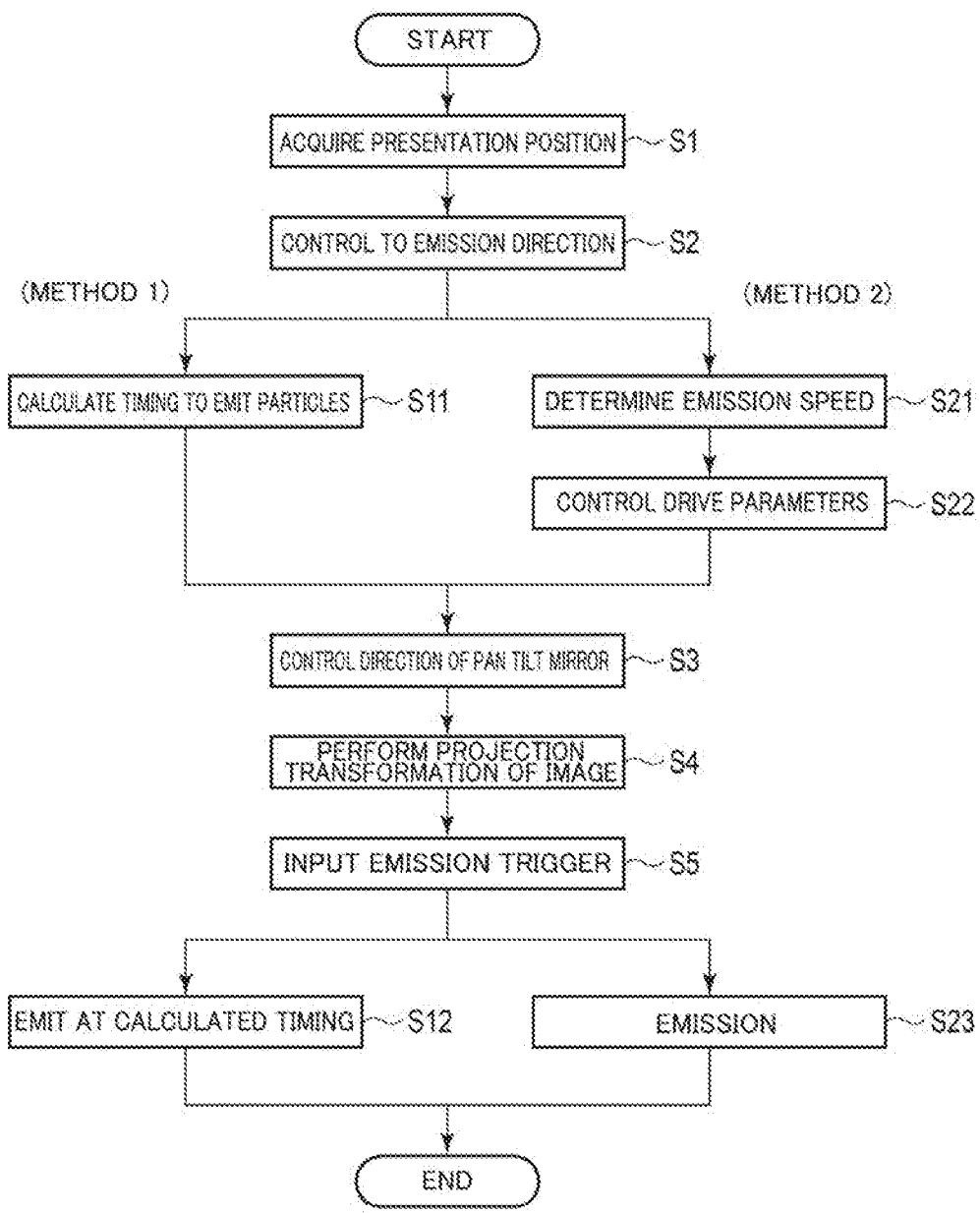
FIG. 3 is a flow chart depicting an operation example of the image presentation system to which the image presentation method according to the embodiment of the present invention is applied.

FIG. 3 is a flow chart depicting the operation example of the image presentation system 10 to which the image presentation method according to the embodiment of the present invention is applied.

As mentioned above, there are two methods of controlling the collision of particles emitted from the two particle emission terminals 20 (#1) and 20 (#2): Method 1, in which the emission speed is constant and the emission timing is controlled; and Method 2, in which the emission timing is constant and the emission speed is controlled. In the flow chart in FIG. 3, in order to describe these two types of methods together, the operations of Method 1 are indicated on the left side, the operations of Method 2 are indicated on the right side, and the operations common to Method 1 and Method 2 are indicated at the center. Therefore FIG. 3 is merely for describing the two methods in one flow chart for convenience, and is not intended to indicate that Method 1 and Method 2 are performed simultaneously. The image presentation system 10 operates according to one of Method 1 and Method 2 as specified by the user.

When the user inputs the data on the presentation position to the control unit 50, the inputted data on the presentation position is transmitted form the control unit 50 to each particle emission terminal 20 and the image projection terminal 30, and is received by the communication function unit 21 of each particle emission terminal 20 and the communication function unit 31 of the image projection terminal 30.

The data on the presentation position received by the communication function unit 21 is converted into coordinates by the presentation position analysis unit 22. Similarly, the data on the presentation position received by the communication function unit 31 is converted into coordinates by the presentation position analysis unit 32 (S1). The coordinates correspond to the coordinates of the retention field 60.

The attitude control function unit 23 of each particle emission terminal 20 determines the attitude (angle) of each particle emission terminal 20 based on the converted coordinates, and drives the pan tilt servo motor, for example, based on the determined attitude (angle), whereby the emission function unit 26 of each particle emission terminal 20 is turned to the emission direction (S2).

The control unit 50 calculates the emission timing and emission speed to emit the particles for each particle emission terminal 20 in accordance with the method inputted by the user, and notifies the data to the corresponding particle emission terminal 20 respectively. The data on the emission timing and emission speed is received by the communication function unit 21 of each particle emission terminal 20.

In the case where the method inputted to the control unit 50 is Method 1, the emission timing control unit 25 determines the timing to drive the emission function unit 26 based on the emission timing received by the communication function unit 21 (S11).

In the case where the method inputted to the control unit 50 is Method 2, the emission parameter setting unit 24 controls parameters to drive the emission function unit 26 based on the emission speed (S21) received by the communication function unit 21 (S22).

Then the attitude control function unit 33 controls the attitude of the image projection terminal 30 and the pan direction and tilt direction of the pan tilt mirror 40 based on the coordinates converted by the presentation position analysis unit 32 (S3).

Then the focal distance calculation function unit 34 calculates the focal distance so that the image is focused on the coordinates analyzed by the presentation position analysis unit 32. Further, the focal point control function unit 35 controls the image projection function unit 38 based on the focal distance. Furthermore, the projection transformation matrix calculation unit 36 calculates a transformation matrix, with which the projection image is not distorted, based on the coordinates analyzed by the presentation position analysis unit 32. This corresponds to the keystone function used for projectors. Furthermore, the image generation function unit 37 selects the projection content from the projection content DB 39, and performs the projection transformation on the projection content using the transformation matrix calculated by the projection transformation matrix calculation unit 36 (S4).

Then the emission timing control unit 25 outputs the emission trigger to the emission function unit 26 in accordance with the timing determined by the emission timing control unit 25 (S5).

In the case where Method 1 is set, particles are emitted from the emission function unit 26 of the particle emission terminal 20 (#1) and the emission function unit 26 of the particle emission terminal 20 (#2) in accordance with the emission trigger at the same speed, but at different timings determined in step S11, so that the particles reach the retention field 60 simultaneously (S12).

In the case where Method 2 is set, particles are emitted at the same time from the emission function unit 26 of the particle emission terminal 20 (#1) and the emission function unit 26 of the particle emission terminal 20 (#2) in accordance with the emission trigger, but at different speeds corresponding to the parameters determined in step S22, so that the particles reach the retention field 60 simultaneously (S23).

In this way, regardless whether Method 1 or Method 2 is used, the particles emitted from the emission function unit 26 of the particle emission terminal 20 (#1) and the particles emitted from the emission function unit 26 of the particle emission terminal 20 (#2) reach the retention field 60 simultaneously, and collide with each other, whereby the aerial screen is formed.

To the aerial screen formed in this way, the image projection function unit 38 projects the projection content, which was projection-transformed by the image generation function unit 37, under control of the focal point control function unit 35. After projecting from the image projection function unit 38, the projection content is reflected by the pan tilt mirror 40, of which pan direction and tilt direction are controlled by the attitude control function unit 33, and is then projected to the aerial screen formed in the retention field 60.

As mentioned above, according to the image presentation system 10 to which the image presentation method according to the embodiment of the present invention is applied, the retention field 60 can be formed by retaining particles, which have scattering characteristics, at any point in space, whereby the image can be projected to the retention field 60, which is used as the aerial screen.

Therefore the aerial image can be immediately presented without time lag. Furthermore, the aerial image can be presented to any point in air, hence the user can view the aerial image without any device, even when moving to a different location.

The present invention is not limited to the above embodiment, but may be carried out by modifying composing elements within a scope that does not depart from the essence thereof. The present invention may be carried out in various ways by appropriately combining a plurality of composing elements disclosed in the above embodiment. For example, some composing elements may be omitted from the composing elements disclosed in the embodiments. Further, the composing elements of different embodiments of the present invention may be appropriately combined.

REFERENCE SIGNS LIST

10 Image presentation system
20 Particle emission terminal
21 Communication function unit
22 Presentation position analysis unit
23 Attitude control function unit
24 Emission parameter setting unit
25 Emission timing control unit
26 Emission function unit
30 Image projection terminal
31 Communication function unit
32 Presentation position analysis unit
33 Attitude control function unit
34 Focal distance calculation function unit
35 Focal point control function unit
36 Projection transformation matrix calculation unit
37 Image generation function unit
38 Image projection function unit
39 Projection content database
40 Pan tilt mirror
50 Control unit
60 Retention field

The invention claimed is:

1. An image presentation system, comprising: a plurality of particle emission units each of which emits particles; and image projection unit; and a control unit, wherein the control unit controls to cause collision of particles emitted from a first particle emission unit, out of the plurality of particle emission units, and particles emitted from a second particle emission unit, out of the plurality of particle emission units, so as to generate a retention field that is used as a screen to which an image is projected and the image projection unit projects an image to the retention field;

wherein the image projection unit includes a focal distance calculation unit that calculates a focal distance so that the image is focused in the retention field; and a focal point control unit that controls the image projection unit based on the calculated focal distance.

2. The image presentation system according to claim 1, wherein the particles emitted from the first particle emission unit and the second particle emission unit are emitted in a state of being enclosed by vortex rings.

3. The image presentation system according to claim 1, wherein the first particle emission unit and the second particle emission unit are configured to emit particles in any direction.

4. An image presentation method, comprising the steps of:
    causing collision of particles emitted from a first particle emission unit and particles emitted from a second particle emission unit, so as to generate a retention field that is used as a screen to which an image is projected;
    calculating, by an image projection unit, a focal distance so that the image is focused in the retention field;
    controlling the image projection unit based on the calculated focal distance; and
    projecting the image to the generated retention field.

5. The image presentation method of claim 4 wherein the particles emitted from the first particle emission unit and the second particle emission unit are emitted in a state of being enclosed by vortex rings.

* * * * *